United States Patent [19]

Yagi et al.

[11] 4,001,174

[45] Jan. 4, 1977

[54] INCOMBUSTIBLE POLYOLEFIN MOLDING COMPOSITIONS AND METHOD OF CROSSLINKING SAME

[75] Inventors: Kiyoshi Yagi, Susono; Miyoshi Yamamoto, Gotenba, both of Japan

[73] Assignee: Yazaki Sogyo Kabushiki Kaisha, Tokyo, Japan

[22] Filed: Oct. 10, 1975

[21] Appl. No.: 621,511

[52] U.S. Cl. .................. 260/45.7 R; 260/45.75 R; 260/28.5 A; 204/159.2; 260/897 B
[51] Int. Cl.² ............... C08K 5/02; C08K 5/03; C08K 3/22
[58] Field of Search ............ 260/45.75 R, 45.7 R, 260/28.5 A, 897; 204/159.2

[56] References Cited

UNITED STATES PATENTS

| | | | |
|---|---|---|---|
| 2,286,744 | 6/1942 | Leatherman | 260/37 R |
| 2,575,687 | 11/1951 | Simon et al. | 260/45.75 R |
| 2,984,576 | 5/1961 | Alexander et al. | 106/55 |
| 3,287,312 | 11/1966 | Ling et al. | 260/45.7 |
| 3,419,518 | 12/1968 | Mahling et al. | 260/45.75 B |
| 3,826,775 | 7/1974 | Sobolev et al. | 260/45.7 R |

*Primary Examiner*—V. P. Hoke
*Attorney, Agent, or Firm*—Oldham & Oldham Co.

[57] ABSTRACT

The present invention relates to providing incombustible polyolefin molding compositions having good properties such as electric insulating property, flexibility, heat resisting property, antismoking property and mechanical property. The said superior properties are brought about by adding zirconium oxide to the polyolefin composition.

In particular, the superior antismoking property is brought about by the synergistic effect of adding zirconium oxide and aluminum oxide or hydroxide to the polyolefin composition. The polyolefin molding composition of the present invention is suitable for the coating composition of electric wire.

14 Claims, No Drawings

INCOMBUSTIBLE POLYOLEFIN MOLDING COMPOSITIONS AND METHOD OF CROSSLINKING SAME

DETAILED DESCRIPTION OF INVENTION

The present invention relates to incombustible molding compositions containing polyolefin as the basic polymer, having several good properties such as electric insulating property, flexibility, heat resisting property, antismoking property and mechanical property. More particularly, the present invention relates to incombustible polyolefin molding compositions comprising (1) polyolefin, low molecular weight chlorine-containing hydrocarbon and zirconium oxide, (2) polyolefin, low molecular weight chlorine-containing hydrocarbon, zirconium oxide and aluminum oxide or hydroxide, (3) polyolefin, chlorine-containing polyolefin and zirconium oxide, (4) polyolefin, chlorine-containing polyolefin, zirconium oxide and aluminum oxide or hydroxide.

The present invention relates also to a method of crosslinking the incombustible polyolefin molding compositions mentioned above by the chemical crosslinking in the presence of (a) peroxide or (b) a mixture of peroxide and polyfunctional monomer or by the crosslinking by the ionizing radiation with polyfunctional monomer.

It is well known that the heat resisting property, the solvent resistance and the mechanical strength of polyolefin can be improved by the chemical crosslinking in the presence of peroxide or by the crosslinking by the ionizing radiation. It is also well known that an incombustible polyolefin composition is obtained by adding chlorinated hydrocarbon and antimony trioxide to polyolefin.

The object of the present invention is to provide the incombustible polyolefin molding compositions having antiweathering property, heat resisting property, volume resistivity property and antismoking property improved by adding zirconium oxide instead of antimony trioxide with or without aluminum oxide or hydroxide. The polyolefin compositions of the present invention have many features as compared with the ordinary incombustible polyolefin composition in view of the low cost and the abundance of zirconium oxide and aluminum oxide or hydroxide.

According to the present invention, polymers or copolymers of olefin such as, for example, polyethylene having a low or moderate density (s.g. 0.92–0.53), polypropylene, polybutene, ethylene-propylene copolymer, ethylene-vinyl acetate copolymer and the like can be used as polyolefin.

Chlorine-containing hydrocarbon having a low molecular weight usable in the present invention is selected from, for example, chlorinated paraffin containing less than 50% by weight of chlorine, epichlorohydrin and the like.

Chlorine-containing polyolefin usable in the present invention is selected from, for example, chlorinated polyethylene, chlorinated polypropylene and chlorinated polybutene, which contain less than 50 weight % of chlorine. Chlorosulfonated polyethylene can also be used.

It is preferable to use chlorine-containing polyolefine containing less than 50% of chlorine, particularly 10–30% of chlorine, because the polyolefin composition obtainable from using the chlorine-containing polyolefin containing more than 50% of chlorine has inferior physical properties.

It is preferable to use a powdered zirconium oxide and aluminum oxide or hydroxide having such a particle size that 99% of powdered particles pass through the sieve of 250 mesh. Even if powders having the particle size of 100–300 mesh are used, it does not exert a bad influence upon the incombustible property of the polyolefin compositions of the present invention.

Polyfunctional monomer usable in the present invention is selected from a group consisting of divinyl benzene, mono-, di-, tri-, and tetra-ethylene glycol diacrylate, mono-, di-, tri- and tetra- ethylene glycol dimethacrylate, vinyl acrylate, vinyl methacrylate, acryl acrylate, nonyl methacrylate, ethylene glycol divinylether, diallyl maleate, diallyl itaconate, diallyl malonate, diallyl benzene phosphonate, triallyl phosphate, triallyl cyanate, glyceryl trimethacrylate and homologues thereof or a mixture thereof.

Peroxides usable in the present invention are organic ones such as benzoyl peroxide, dicumyl peroxide and the like which are useful for an ordinary polymerization.

The following are examples of the compounding ratio of components in the polyolefin molding compositions having incombustible and antismoking properties according to the present invention.

I. Using chlorine-containing hydrocarbon having a low molecular weight.

1. In the polyolefin composition comprising chlorine-containing hydrocarbon having a low molecular weight and zirconium oxide, the amount of chlorine-containing hydrocarbon ranges from 1.0 to 75 weight parts, preferably 15 to 30 weight parts per 100 weight parts of polyolefin and the amount of zirconium oxide ranges from 1 to 35 weight parts, preferably 10 to 20 weight parts per 100 weight parts of polyolefin.

2. In the polyolefin composition comprising chlorine-containing hydrocarbon having a low molecular weight, zirconium oxide and aluminum oxide or hydroxide, the amount of aluminum oxide or hydroxide ranges from 50 to 100 weight parts per 100 weight parts of polyolefin and the amounts of other components are the same as those in the polyolefin compositions comprising zirconium oxide only.

II. Using chlorine-containing polyolefin.

1. In the polyolefin composition comprising chlorine-containing polyolefin and zirconium oxide, the amount of chlorine-containing polyolefin ranges from 5 to 95 weight parts, preferably from 15 to 30 weight parts, per 100 weight parts of polyolefin. The amount of chlorine in chlorine-containing polyolefin ranges from 0.1 to 50 weight parts per 1 weight part of zirconium oxide.

2. In the polyolefin compositions comprising chlorine-containing polyolefin, zirconium oxide and aluminum hydroxide or oxide, the amount of aluminum hydroxide or oxide ranges from 50 to 100 weight parts per 100 weight parts of polyolefin and the amounts of other components are the same as those of the polyolefin composition comprising zirconium oxide only.

Even when antioxidant, pigment, dye, inorganic filler and the like usable usually in the rubber or plastic industries are added in the amount of 10 to 30 weight % to said polyolefin compositions, the incombustibility of the obtainable polyolefin compositions is not affected at all.

As the inorganic filler, for example, mica, talc or the like can be used.

The components mentioned above are mixed uniformly by means of a blending roll, a banbury mixer, a kneader mixer or the like. Then the additional chemicals necessary for the chemical crosslinking or the crosslinking of the ionizing radiation are added. Finally, the thus obtained mixture is extruded by means of an extruder having braker plates to manufacture the pellet type compounding material.

The method of crosslinking the incombustible polyolefin molding compositions uncrosslinked of the present invention will be detailed as follows:

I. The chemical crosslinking.

The crosslinking is carried out at a temperature ranging from 60° to 320° C after adding 2 weight % of peroxide with or without 0.05–30 weight % of polyfunctional monomer on the basis of polyolefin to the polyolefin compositions mentioned above. The crosslinking time is varied depending on the crosslinking temperature. For example, the time is 15 min. at 180° C.

II. The crosslinking by the ionizing radiation.

The crosslinking is carried out under the radiation at doses of 1–30 Mrad after adding 0.05–30% by weight of polyfunctional monomer on the basis of polyolefin to the polyolefin compositions mentioned above.

These and other features and advantages of the invention will become more apparent from the following examples. However, these examples are intended to explain the invention and do not limit the scope of the invention.

EXAMPLE 1

Several polyolefin molding compositions comprising polyethylene 100 parts, paraffin wax 2 parts, antioxidant 2 parts and zirconium oxide and chlorinated paraffin in the amount reported in Table 1 are prepared by mixing uniformly on the rollers heated to a temperature of 120°–140° C and then molding by way of a heat press (samples I-P, R and T).

For the purpose of comparison, the ordinary polyolefin molding compositions comprising antimony trioxide are prepared similarly (samples A-H, Q and S).

These samples are subjected to several tests on the tensile strength, the elongation, the permittivity, the incombustibility (UL-758) and the elongation percentage after heat ageing.

The results obtained are listed in the Table 1.

Even when the polyolefin compositions (samples I-P, R and T) are subjected to the chemical crosslinking at 160° C for 20 min. and 30 min. after adding 3 weight % of dicumyl peroxide and 0.2 weight % of polyfunctional monomer on the basis of polyethylene, the properties are not affected. The properties of the obtained polymers are such that the dripping does not occur. Moreover, even when the said polyolefin compositions are subjected to the crosslinking by the ionizing radiation with addition of 0.05–4 weight % of polyfunctional monomer on the basis of polyethylene by the radiation at doses of 14 Mrad, the resulting polymers having good properties without any occurrence of the dripping can be obtained.

EXAMPLE 2

Several polyolefin molding compositions having the same composition to those of the example 1 using chlorinated polyethylene instead of chlorinated hydrocarbon are prepared. The tensile strength, elongation, incombustibility, permittivity, and heat-ageing of the resulting compositions are tested respectively. The results obtained are listed in table 2.

When 10 to 30 weight % of talc are added to the compositions given in the table 2 on the basis weight of polyethylene, it has been observed that the tensile strength and the elongation of the resulting composition somewhat depress but that the incombustibility of the resulting composition does not vary.

To crosslink the composition given in table 2 by the chemical process or the radiation process, 0.05 to 30 weight % of polyfunctional monomer are added to the compositions mentioned above.

The resulting composition show good properties of tensile strength, the elongation, the permittivity and the heat ageing. In the comparison test, the compositions A' to T' are prepared using the compositions A to T of table 1 using chlorinated polyethylene instead of chlorinated hydrocarbon, together with 15 weight % of polyfunctional monomer by the radiation crosslinking respectively. The incombustibility of the compositions A' to T' are tested. The following results were obtained showing the incombustibility after a lapse of more than 60 seconds from the beginning of test in the compositions A', B' and C'; after a lapse of 50 seconds in the compositions D' and E'; after a lapse of 15 seconds in the compositions F' and G'; after a lapse of 50 seconds in the composition H'; after a lapse of zero seconds in the compositions I' and J'; after a lapse of 40 seconds in the compositions K', L' and M'; immediately after the beginning of test in the compositions N' and O'; after a lapse of 40 seconds in the compositions P', Q', R', S' and T' respectively. From the above test results, it has been observed that the compositions comprising zirconium oxide are superior to that comprising antimony trioxide in incombustibility.

EXAMPLE 3

Several polyolefin molding compositions comprising 100 parts of polyethylene, 2 parts of paraffin wax, 2 parts of antioxidant and other components given in the table 3 are prepared.

The crosslinking is carried out at a temperature of 160° C for 20 and then for a further 30 minutes after adding 3 weight % of dicumyl peroxide and 0.2 weight % of polyfunctional monomer on the basis of polyolefin respectively. The said crosslinking does not have any bad effect on the properties of the resulting polyolefin compositions. It has been observed that the dripping does not occur in the incombustibility test (UL-94-V-O, JIS-C-3005).

The said polyolefin compositions are crosslinked adding 0.05 to 4 weight % of polyfunctional monomer on the basis of polyethylene by the radiation of 14 Mrad.

The polyolefin compositions having good properties as shown in table 3 are prepared and no dripping is observed in the resulting polymer compositions.

It has been observed that the resulting polymer compositions possess superior heat resistance and the antismoking properties.

EXAMPLE 4

Several polyolefin molding compositions having the same composition to those of the example 3 are prepared using chlorinated hydrocarbon. The conditions of the chemical crosslinking and the radiation crosslinking are same as those in example 3.

The heat resistance and antismoking tests are effected in the same test conditions to those of the example 3.

The test results are same as those in example 3.

When 10 to 30 weight % of talc are compounded to the said polyethylene compositions on the basis of polyethylene, it has been observed that the tensile strength and the elongation somewhat depress and that the incombustibility, the heat resistance and the antismoking properties are not affected by the addition of talc. The good results have been obtained without exerting a bad effect on the incombustibility, the heat resistance and the antismoking properties of the resulting polyethylene composition when 0.05 to 30 weight % of polyfunctional monomer are compounded to said polyethylene compositions in the chemical and radiation crosslinkings.

In example 4, it has been observed that the incombustibility, the heat-resistance and the antismoking properties are obtained in the polyethylene compositions compounding zirconium oxide and aluminum hydroxide or oxide rather than the polyethylene composition compounding zirconium oxide only.

The polyolefin molding compositions of the present invention are suitable for the coating composition of electrical wire.

Table 1

|  | A | B | C | D | E | F | G | H | I | J |
|---|---|---|---|---|---|---|---|---|---|---|
| Antimony trioxide | 3 | 5 | 10 | 20 | 40 | 60 | 80 | 20 |  |  |
| Zirconium oxide |  |  |  |  |  |  |  |  | 3 | 5 |
| Cholrinated paraffin (chlorine content = 15%) | 20 | 20 | 20 | 20 | 20 | 20 | 20 | 0 | 20 | 20 |
| Tensile strength (kg/cm²) | 180 | 180 | 170 | 160 | 150 | 120 | 100 | 185 | 190 | 180 |
| Elongation percentage (%) | 400 | 400 | 260 | 200 | 150 | 100 | 80 | 420 | 420 | 400 |
| Incombustibility (sec.) | 30 | 30 | 15 | 10 | 5 | 0 | 0 | 60 | 20 | 11 |
| Permittivity (60cycle. 25°C) | 3.5 | 3.5 | 4.0 | 4.5 | 4.8 | 5.0 | 5.5 | 3.5 | 3.0 | 3.2 |
| elongation percentage after heat ageing at 100°C for 240 hours (%) | 25 | 20 | 25 | 35 | 40 | 45 | 50 | 25 | 25 | 30 |

|  | K | L | M | N | O | P | Q | R | S | T |
|---|---|---|---|---|---|---|---|---|---|---|
| Antimony trioxide |  |  |  |  |  |  | 20 |  | 20 |  |
| Zirconium oxide | 10 | 20 | 40 | 60 | 80 | 20 |  | 20 |  | 20 |
| Cholrinated paraffin (chlorine content = 15%) | 20 | 20 | 20 | 20 | 20 | 0 | 15 | 15 | 30 | 30 |
| Tensile strength (kg/cm²) | 180 | 165 | 160 | 130 | 110 | 190 | 160 | 170 | 155 | 165 |
| Elongation percentage (%) | 380 | 360 | 320 | 250 | 180 | 480 | 250 | 350 | 190 | 340 |
| Incombustibility (sec.) | 3 | 0 | 0 | 0 | 0 | 60 | 10 | 0 | 0 | 0 |
| Permittivity (60cycle. 25°C) | 3.5 | 3.9 | 4.3 | 4.5 | 4.5 | 3.0 | 4.3 | 3.6 | 4.7 | 4.0 |
| Elongation percentage after heat ageing at 100°C for 240 hours (%) | 25 | 25 | 30 | 35 | 40 | 15 | 30 | 20 | 40 | 35 |

Table 2

|  | A' | B' | C' | D' | E' | F' | G' | H' | I' | J' |
|---|---|---|---|---|---|---|---|---|---|---|
| Chemical crosslinking |  |  |  |  |  |  |  |  |  |  |
| Tensile strength (kg/cm²) | 160 | 155 | 140 | 130 | 130 | 120 | 110 | 170 | 170 | 168 |
| Elongaton (%) | 420 | 400 | 400 | 380 | 350 | 300 | 250 | 450 | 450 | 430 |
| Incombustibility (sec.) | 0 | 0 | 0 | 0 | 0 | 0 | 0 | 0 | 0 | 0 |
| Radiation crosslinking (14 Mrad) |  |  |  |  |  |  |  |  |  |  |
| Tensile strength (kg/cm²) | 155 | 140 | 140 | 135 | 120 | 110 | 110 | 170 | 170 | 160 |
| Elongation (%) | 410 | 400 | 380 | 320 | 350 | 300 | 250 | 440 | 420 | 420 |
| Incombustibility (sec.) | 0 | 0 | 0 | 0 | 0 | 0 | 0 | 0 | 0 | 0 |
| Uncrosslinking |  |  |  |  |  |  |  |  |  |  |
| Tensile strength (kg/cm²) | 140 | 130 | 120 | 120 | 110 | 110 | 80 | 150 | 150 | 140 |
| Elongation (%) | 250 | 200 | 200 | 180 | 150 | 150 | 100 | 50 | 250 | 200 |
| Incombustibility (sec.) | 0 | 0 | 0 | 0 | 0 | 0 | 0 | 0 | 0 | 0 |

|  | K' | L' | M' | N' | O' | P' | Q' | R' | S' | T' |
|---|---|---|---|---|---|---|---|---|---|---|
| Chemical crosslinking |  |  |  |  |  |  |  |  |  |  |
| Tensile strength (kg/cm²) | 165 | 160 | 155 | 150 | 155 | 175 | 140 | 165 | 130 | 160 |
| Elongation (%) | 430 | 425 | 410 | 380 | 350 | 480 | 400 | 430 | 360 | 420 |
| Incombustibility (sec.) | 0 | 0 | 0 | 0 | 0 | 0 | 0 | 0 | 0 | 0 |
| Radiation crosslinking (14 Mrad) |  |  |  |  |  |  |  |  |  |  |
| Tensile strength (kg/cm²) | 160 | 160 | 145 | 140 | 150 | 175 | 140 | 160 | 125 | 150 |
| Elongation (%) | 430 | 420 | 410 | 350 | 330 | 470 | 400 | 420 | 335 | 410 |
| Incombustibility (sec.) | 0 | 0 | 0 | 0 | 0 | 0 | 0 | 0 | 0 | 0 |
| Uncrosslinking |  |  |  |  |  |  |  |  |  |  |
| Tensile strength (kg/cm²) | 140 | 140 | 120 | 120 | 130 | 155 | 120 | 130 | 110 | 130 |
| Elongation (%) | 210 | 230 | 220 | 210 | 150 | 150 | 280 | 200 | 130 | 210 |
| Incombustibility (sec.) | 0 | 0 | 0 | 0 | 0 | 0 | 0 | 0 | 0 | 0 |

Table 3

|  | A | B | C | D | E | F | G | H | I | J | K | L | M | N | O | P | Q |
|---|---|---|---|---|---|---|---|---|---|---|---|---|---|---|---|---|---|
| Aluminum hydroxide |  |  |  |  |  |  | 50 | 50 | 50 | 50 | 50 | 100 | 100 | 100 | 100 | 100 | 150 |
| Zirconium oxide | 3 | 5 | 10 | 20 | 40 | 80 | 3 | 5 | 10 | 20 | 80 | 3 | 5 | 10 | 20 | 80 | 20 |
| Chlorinated paraffin contained 15wt % chlorine | 20 | 20 | 20 | 20 | 20 | 20 | 20 | 20 | 20 | 20 | 20 | 20 | 20 | 20 | 20 | 20 | 20 |
| Tensile strength kg/cm² | 190 | 180 | 180 | 165 | 160 | 110 | 160 | 160 | 150 | 140 | 115 | 140 | 140 | 130 | 120 | 100 | 80 |
| elongation |  |  |  |  |  |  |  |  |  |  |  |  |  |  |  |  |  |
| room temp. | 420 | 400 | 380 | 360 | 320 | 180 | 350 | 350 | 300 | 300 | 290 | 340 | 340 | 300 | 280 | 200 | 150 |
| 130° C × 24 | 400 | 400 | 370 | 360 | 300 | 180 | 340 | 340 | 300 | 290 | 290 | 340 | 320 | 300 | 280 | 200 | 150 |
| 130° C × 96 | 400 | 380 | 350 | 360 | 280 | 170 | 320 | 300 | 290 | 280 | 290 | 320 | 300 | 300 | 280 | 190 | 150 |
| 130° C × 140 | 360 | 370 | 340 | 340 | 270 | 160 | 320 | 300 | 280 | 250 | 290 | 300 | 300 | 300 | 250 | 190 | 150 |
| oxygen indicator (%) | 20 | 20 | 23 | 25 | 30 | 35 | 25 | 25 | 28 | 32 | 37 | 30 | 35 | 38 | 40 | 50 | 55 |
| smoke concentration (%) | 65 | 50 | 45 | 40 | 30 | 10 | 20 | 15 | 10 | 8 | 2 | 10 | 5 | 4 | 3 | 0 | 0 |
| Incombustibility (sec.) | 30 | 30 | 15 | 10 | 5 | 0 | 30 | 30 | 15 | 0 | 0 | 15 | 15 | 10 | 0 | 0 | 0 |
| UL-758 (five times) |  |  |  |  |  | pass |  |  |  | pass | pass |  |  | pass | pass | pass | pass |
| UL-94 V-0 (JIS-C-3005) |  |  |  |  |  | pass |  |  |  | pass | pass |  |  | pass | pass | pass | pass |

What is claimed is:

1. An incombustible polyolefin molding composition characterized by comprising 100 parts by weight of a polyolefin, 1–35 parts by weight of zirconium oxide, 50–100 parts by weight of a compound selected from the class consisting of aluminum hydroxide and aluminum oxide and 1–75 parts by weight of chlorine-containing hydrocarbon having a chlorine content of less than 50% by weight.

2. The incombustible polyolefin molding compositions according to claim 1 characterized in that the amount of chlorine-containing hydrocarbon ranges from 15 to 30 parts by weight per 100 parts by weight of polyolefin.

3. An incombustible polyolefin molding composition according to claim 2 wherein said polyolefin selected from the class consisting of polyethylene, polypropylene, polybutane, ethylene-propylene-copolymer and ethylene-vinyl acetate copolymer.

4. A method of crosslinking the uncrosslinked polyolefin compositions according to claim 1 characterized by crosslinking said uncrosslinked polyolefin composition at a temperature ranging from 60° to 320° C. in the presence of organic peroxide.

5. A method of crosslinking the uncrosslinked polyolefin composition according to claim 1 characterized by including from 0.05 to 30% by weight of a polyfunctional monomer based upon said polyolefin.

6. A method of crosslinking the uncrosslinked polyolefin compositions according to claim 1 characterized by crosslinking said uncrosslinked polyolefin composition by means of radiation at doses of 1–30 Mrad.

7. A method of crosslinking the uncrosslinked polyolefin composition according to claim 1 characterized by including from 0.05 to 30% by weight of a polyfunctional monomer based upon said polyolefin.

8. An incombustible polyolefin molding composition characterized by comprising 100 parts by weight of a polyolefin, 1–35 parts by weight of zirconium-oxide, 50–100 parts of a compound selected from the class consisting of aluminum hydroxide and aluminum oxide and 1–95 parts by weight of a chlorine-containing polyolefin having a chlorine content of less than 50% by weight, said chlorine-containing polyolefin being in the range of from 0.1 to 50 parts by weight per one part by weight of zirconium oxide.

9. The incombustible polyolefin molding compositions according to claim 8 characterized in that the amount of said chlorine-containing polyolefin ranges from 15 to 30 parts by weight per 100 parts by weight of polyolefin.

10. An incombustible polyolefin molding composition according to claim 8, wherein said polyolefin is selected from the class consisting of polyethylene, polypropylene, polybutene, ethylene-propylene copolymer, and ethylene-vinyl acetate copolymer, and said chlorine-containing polyolefin is selected from the class consisting of chlorinated polyethylene, chlorinated polypropylene, chlorinated polybutene and chlorosulfated polyethylene.

11. A method of crosslinking the uncrosslinked polyolefin composition according to claim 8 characterized by crosslinking said uncrosslinked polyolefin composition at a temperature ranging from 60° to 320° C. in the presence of an organic peroxide.

12. A method of crosslinking the uncrosslinked polyolefin composition according to claim 11 characterized by including from 0.05 to 30% by weight of a polyfunctional monomer based upon said polyolefin.

13. A method of crosslinking the uncrosslinked polyolefin composition according to claim 8 characterized by crosslinking said uncrosslinked polyolefin composition by means of radiation and doses of 1 to 30 Mred.

14. A method of crosslinking the uncrosslinked polyolefin composition according to claim 13 characterized by including from 0.05 to 30% by weight of a polyfunctional monomer based upon said polyolefin.

* * * * *